US008923618B2

(12) United States Patent  (10) Patent No.: US 8,923,618 B2
Kutsumi  (45) Date of Patent: Dec. 30, 2014

(54) INFORMATION OUTPUT DEVICE AND INFORMATION OUTPUT METHOD

(75) Inventor: Takeshi Kutsumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 286 days.

(21) Appl. No.: 13/618,122

(22) Filed: Sep. 14, 2012

(65) Prior Publication Data

US 2013/0108162 A1  May 2, 2013

(30) Foreign Application Priority Data

Oct. 28, 2011 (JP) ................................ 2011-237493

(51) Int. Cl.
G06K 9/18 (2006.01)
G06K 9/03 (2006.01)
G06F 17/27 (2006.01)

(52) U.S. Cl.
CPC . G06F 17/27 (2013.01); G06K 9/03 (2013.01)
USPC ........... 382/182; 382/177; 382/185; 382/176; 704/2; 704/4; 704/5; 704/9

(58) Field of Classification Search
CPC .......... G06K 2209/01; G06K 9/00469; G06K 9/6807; G06K 9/00744; G06K 9/03; G06F 17/2836; G06F 17/21; G06F 17/2854; G06F 17/289; G06F 17/27
USPC ........... 382/182, 176, 177, 185; 704/2, 4, 5, 9
See application file for complete search history.

(56) References Cited

U.S. PATENT DOCUMENTS

| 4,323,892 | A  | * | 4/1982 | Kinghorn | 345/467 |
|---|---|---|---|---|---|
| 5,023,786 | A  | * | 6/1991 | Kugimiya et al. | 704/4 |
| 2004/0177064 | A1 | * | 9/2004 | Satoh | 707/3 |
| 2004/0199378 | A1 | * | 10/2004 | Itoh et al. | 704/5 |
| 2009/0012776 | A1 | * | 1/2009 | Chino et al. | 704/7 |
| 2009/0055159 | A1 | * | 2/2009 | Kato | 704/3 |
| 2011/0110599 | A1 | * | 5/2011 | Sata et al. | 382/229 |
| 2011/0164291 | A1 | * | 7/2011 | Kutsumi et al. | 358/464 |
| 2012/0310933 | A1 | * | 12/2012 | Caputo et al. | 707/732 |

FOREIGN PATENT DOCUMENTS

| JP | 5-205108 A | 8/1993 |
|---|---|---|
| JP | 9-44604 A | 2/1997 |
| JP | 9-44606 A | 2/1997 |
| JP | 2011-100356 A | 5/2011 |

* cited by examiner

*Primary Examiner* — Stephen R Koziol
*Assistant Examiner* — Shaghayegh Azima
(74) *Attorney, Agent, or Firm* — Birch, Stewart, Kolasch & Birch, LLP

(57) ABSTRACT

An expression, for which complementary information can be outputted, is extracted from a document obtained by character recognition for an image. Complementary information related to the extracted expression is outputted when a character or a symbol adjacent to the beginning or the end of the extracted expression is not a predetermined character or symbol. Output of complementary information related to the extracted expression is skipped when the character or symbol adjacent to the beginning or the end of the extracted expression is the predetermined character or symbol. A problem that complementary information unrelated to an original text is outputted is prevented even when a false character recognition occurs.

6 Claims, 17 Drawing Sheets

FIG. 5

| CHARACTER NUMBER | LEFT X | TOP Y | RIGHT X | BOTTOM Y | AREA NUMBER | POSITION IN LINE | SIZE | CHARACTER |
|---|---|---|---|---|---|---|---|---|
| 260 | 110 | 609 | 131 | 588 | 0 | 1 | 24 | A |
| 261 | 135 | 603 | 148 | 588 | 0 | 0 | 24 | n |
| 262 | 151 | 604 | 167 | 588 | 0 | 0 | 24 | ! |
| 263 | 171 | 604 | 181 | 588 | 0 | 0 | 24 | (SPACE) |
| 264 | 184 | 603 | 197 | 588 | 0 | 0 | 24 | m |
| 265 | 198 | 603 | 203 | 588 | 0 | 0 | 24 | a |
| 266 | 218 | 605 | 239 | 587 | 0 | 0 | 24 | — |
| 267 | 232 | 604 | 241 | 588 | 0 | 0 | 24 | . |
| 268 | 243 | 605 | 260 | 588 | 0 | 0 | 24 | (SPACE) |
| 269 | 264 | 604 | 278 | 588 | 0 | 0 | 24 | i |
| 270 | 281 | 603 | 298 | 588 | 0 | 0 | 24 | o |
| 271 | 302 | 603 | 330 | 588 | 0 | 2 | 24 | n |

FIG. 7

| An! mal; ion |

FIG. 8

| ORIGINAL EXPRESSION | TRANSLATED EXPRESSION | TRANSLATION LEVEL |
|---|---|---|
| abundance | 存在度 | 4 |
| an | 一つの | 0 |
| animation | アニメーション | 4 |
| ion | イオン | 4 |
| sign | サイン | 4 |
| significant | 重大な | 4 |

FIG. 9A

| ID | CHARACTER NUMBER | NUMBER OF CHARACTERS | EXTRACTED EXPRESSION | TRANSLATED EXPRESSION | TRANSLATION LEVEL | TRANSLATION PERMISSION/DENIAL |
|---|---|---|---|---|---|---|
| 1 | 260 | 2 | An | | 0 | |
| 2 | 269 | 3 | ion | | 4 | |

FIG. 9B

| ID | CHARACTER NUMBER | NUMBER OF CHARACTERS | EXTRACTED EXPRESSION | TRANSLATED EXPRESSION | TRANSLATION LEVEL | TRANSLATION PERMISSION/DENIAL |
|---|---|---|---|---|---|---|
| 1 | 260 | 9 | Animation | | 4 | |

F I G. 1 1

| CHARACTER ID | 0 | 1 | 2 | 3 | 4 | 5 |
|---|---|---|---|---|---|---|
| SPECIAL CHARACTER | \| | \| | ¦ | ; | ; | ! |

F I G. 13A

| ID | CHARACTER NUMBER | NUMBER OF CHARACTERS | EXTRACTED EXPRESSION | TRANSLATED EXPRESSION | TRANSLATION LEVEL | TRANSLATION PERMISSION/DENIAL |
|---|---|---|---|---|---|---|
| 1 | 260 | 2 | An | | 0 | DENIAL |
| 2 | 269 | 3 | ion | | 4 | DENIAL |

F I G. 13B

| ID | CHARACTER NUMBER | NUMBER OF CHARACTERS | EXTRACTED EXPRESSION | TRANSLATED EXPRESSION | TRANSLATION LEVEL | TRANSLATION PERMISSION/DENIAL |
|---|---|---|---|---|---|---|
| 1 | 260 | 9 | Animation | アニメーション | 4 | PERMISSION |

F I G. 1 4 A
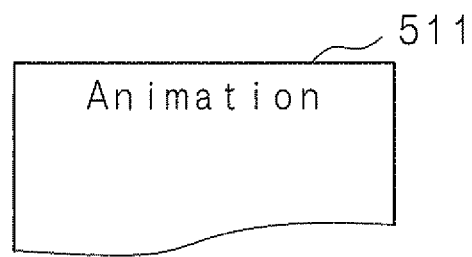
F I G. 1 4 B

US 8,923,618 B2

INFORMATION OUTPUT DEVICE AND INFORMATION OUTPUT METHOD

CROSS-REFERENCE TO RELATED APPLICATIONS

This Nonprovisional application claims priority under 35 U.S.C. §119(a) on Patent Application No. 2011-237493 filed in Japan on Oct. 28, 2011, the entire contents of which are hereby incorporated by reference.

FIELD

The present invention relates to an information output device and an information output method for outputting complementary information concerning a document obtained by character recognition for an image.

BACKGROUND

Conventional techniques have been proposed to read a document recorded on an original such as paper or a book as an image using an image reading device and conduct character recognition processing for the read image (see Japanese Patent Application Laid-Open No. H9-44604 and Japanese Patent Application Laid-Open No. H9-44606). Moreover, another conventional technique has been proposed to translate an original document (which will be hereinafter referred to as an original text) using a text outputted as a result of character recognition processing (see Japanese Patent Application Laid-Open No. 2011-100356).

A document image generating device described in Japanese Patent Application Laid-Open No. 2011-100356 generates an electronic document image (which will be hereinafter referred to as a translation-attached document image), in which a result (which will be hereinafter referred to as a translated text) of translation of an original text is attached in the form of rubi in a space between lines of the original text, on the basis of an electronic document image (which will be hereinafter referred to as an original text image) representing the original text.

In the following description, an expression included in an original text will be referred to as an original expression, and a translated expression to be attached to an original expression in the form of rubi will be referred to as translation rubi. Moreover, in order to clearly indicate a space character existing between characters, an underscore "_" is used instead of a space character " " in the following description. When translating English into Japanese, general nouns such as "Animation" and "ion" are normally translated. However, an indefinite article, an expression which is not listed in a dictionary used for translation (e.g., "ma"), and the like are not translated.

A document image generating device such as the device described in Japanese Patent Application Laid-Open No. 2011-100356 treats a result of recognition "Animation" as one word "Animation" when an original expression "Animation", for example, is recognized correctly as "Animation" by character recognition. At this moment, correct translation rubi "アニメーション" ("animation" in Japanese) is attached to the original expression "Animation".

SUMMARY

However, when the original expression "Animation" is falsely recognized as "An!_ma|;_ion" by character recognition (that is, in the case of false recognition), the result of recognition "An!_ma|;_ion" is treated as three words "An", "ma" and "ion". At this moment, false translation rubi "イオン" ("ion" in Japanese) is attached to "ion" lying at the last part of the original expression "Animation". The false translation rubi is often not related to the original expression at all. This may possibly cause a reader of the translated text to misunderstand the meaning of the original text or fail to understand the meaning and get confused.

The present invention has been made in view of such background, and the main object thereof is to provide an information output device and an information output method, which can prevent a problem that complementary information unrelated to an original text is outputted even when a false recognition occurs, by means of a structure not to output complementary information of an obtained expression when a character or a symbol adjacent to the beginning (or the end) of an expression that is obtained by character recognition for an image is a predetermined character or symbol.

An information output device according to the present invention is an information output device for outputting complementary information related to a document obtained by character recognition for an image, comprising: an expression extraction unit for extracting an expression, for which complementary information can be outputted, from the document; an expression judgment unit for judging whether a character or a symbol adjacent to a beginning or an end of the expression extracted by the expression extraction unit is a predetermined character or symbol or not; a complementary output unit for outputting complementary information related to the extracted expression when the expression judgment unit judges that the character or symbol adjacent to a beginning or an end of the extracted expression is not the predetermined character or symbol; and an output skip unit for skipping output of complementary information related to the extracted expression when the expression judgment unit judges that the character or symbol adjacent to a beginning or an end of the extracted expression is the predetermined character or symbol.

In an information output device according to the present invention, the expression judgment unit is constructed to judge whether all of N (N is a natural number satisfying N≥2) characters or symbols adjacent to a beginning or an end of the extracted expression are the predetermined character or symbol or not, the complementary output unit is constructed to output complementary information related to the extracted expression when the expression judgment unit judges that at least one character or symbol of the N characters or symbols is not the predetermined character or symbol, and the output skip unit is constructed to skip output of complementary information related to the extracted expression when the expression judgment unit judges that all of the N characters or symbols are the predetermined character or symbol.

In an information output device according to the present invention, the expression judgment unit is constructed to ignore a space character when the space character lies adjacent to a beginning or an end of the extracted expression.

An information output method according to the present invention is an information output method for outputting complementary information related to a document obtained by character recognition for an image, comprising steps of: extracting an expression, for which complementary information can be outputted, from the document; outputting complementary information related to the extracted expression when a character or a symbol adjacent to a beginning or an end of the extracted expression is not a predetermined character or symbol; and skipping output of complementary information related to the extracted expression when the character or symbol adjacent to a beginning or an end of the extracted expression is the predetermined character or symbol.

A computer program according to the present invention is a computer program for causing a computer to output complementary information related to a document obtained by character recognition for an image, comprising: an extraction step of causing a computer to extract an expression, for which complementary information can be outputted, from the document; an expression judgment step of causing a computer to judge whether a character or a symbol adjacent to a beginning or an end of the expression extracted in the extraction step is a predetermined character or symbol or not; an output step of causing a computer to output complementary information related to the extracted expression when it is judged in the expression judgment step that the character or symbol adjacent to a beginning or an end of the extracted expression is not the predetermined character or symbol; and a skip step of causing a computer to skip output of complementary information related to the extracted expression when it is judged in the expression judgment step that the character or symbol adjacent to a beginning or an end of the extracted expression is the predetermined character or symbol.

In the present invention, an information output device is provided with an expression extraction unit, an expression judgment unit, a complementary output unit, and an output skip unit. An information output device according to the present invention implements an information output method according to the present invention. A computer program according to the present invention implements various kinds of means provided in an information output device according to the present invention by software, using hardware elements of a computer.

The expression extraction unit extracts an expression, for which complementary information can be outputted, from a document obtained by character recognition for an image. Here, an expression, for which complementary information can be outputted, means at least an expression, for which complementary information exists. Moreover, an expression extracted by the expression extraction unit means an expression included in a document obtained by character recognition for an image. An expression extracted by the expression extraction unit is referred to as an extracted expression.

A document obtained by character recognition for an image may possibly be different from the original document (i.e., an original text). This is because a false recognition may possibly occur in the process of character recognition. Therefore, the expression judgment unit judges whether a character or a symbol adjacent to at least one of the beginning and the end of an extracted expression is a predetermined character or symbol (which will be hereinafter referred to as a special character) or not.

Here, a special character means a character or a symbol (e.g., a symbol "x" for a character "X"), which is likely to be obtained by false recognition for a character or a symbol included in an original text. Alternatively, a special character means a character or a symbol (e.g., a symbol "•" for a point-like spot), which is likely to be obtained by false recognition for a spot, a space part or the like included in an image.

A case where the expression judgment unit judges that a character or a symbol adjacent to the beginning or the end of an extracted expression is not the predetermined character or symbol means a case where a character or a symbol adjacent to the beginning (or the end) of the extracted expression is not a special character. In such a case, it can be presumed that an extracted expression has been obtained as a result of correct character recognition. Therefore, the complementary output unit outputs complementary information related to the extracted expression in such a case. The complementary information to be outputted at this moment is complementary information related to the original expression.

On the other hand, when the expression judgment unit judges that a character or a symbol adjacent to the beginning (or the end) of an extracted expression is a special character, it can be presumed that the extracted expression has been obtained as a result of false recognition. Therefore, the output skip unit skips output of complementary information related to the extracted expression in such a case. The complementary information, output of which is skipped at this moment, (i.e., complementary information not to be outputted) is complementary information unrelated to the original expression.

In the present invention, the expression judgment unit judges whether all of N characters or symbols adjacent to at least one of the beginning and the end of an extracted expression are a special character or not. This is because it is considered that all of N characters or symbols adjacent to the beginning (or the end) of an extracted expression obtained by correct character recognition are unlikely to be special characters, though a special character may possibly be obtained as a result of correct character recognition for an original text.

A case where the expression judgment unit judges that at least one character or symbol of the N characters or symbols is not the predetermined character or symbol means a case where at least one character or symbol of N characters or symbols adjacent to the beginning (or the end) of an extracted expression is not a special character. In such a case, it can be presumed further reliably that an extracted expression has been obtained as a result of correct character recognition. Therefore, the complementary output unit outputs complementary information related to the extracted expression in such a case.

On the other hand, when the expression judgment unit judges that all of characters or symbols adjacent to the beginning (or the end) of an extracted expression are special characters, it can be presumed further reliably that the extracted expression has been obtained as a result of false recognition. Therefore, the output skip unit skips output of complementary information related to the extracted expression in such a case.

Consequently, it is possible to prevent occurrence of a judgment error by the expression judgment unit, that is, in judgment of whether recognition is correct or false. Furthermore, it is possible to prevent a problem that complementary information related to an extracted expression obtained as a result of correct character recognition is not outputted.

In the present invention, when a space character lies adjacent to at least one of the beginning and the end of an extracted expression, the expression judgment unit ignores a space character and performs judgment processing. In an English text, for example, a space character is disposed between words, between sentences and the like. This may possibly cause the expression judgment unit to make a false judgment of an extracted expression obtained as a result of correct character recognition and an extracted expression obtained as a result of false recognition regardless of whether a space character is included in a special character or not, if the expression judgment unit performs judgment processing without ignoring a space character. When the expression judgment unit ignores a space character and performs judgment processing, it is possible to prevent such a problem.

With an information output device and an information output method of the present invention, it is possible to prevent output of complementary information related to an expression obtained as a result of false recognition, that is, complementary information unrelated to an original expression. Hence, it is possible to prevent occurrence of a problem that useless complementary information unrelated to an original expression causes misunderstanding, confusion or the like for an original expression and even for an original text. In the meantime, it is possible to output complementary information related to an expression obtained as a result of correct character recognition, that is, complementary information related to an original expression. Useful complementary information related to an original expression can assist understanding of an original expression and even of an original text.

The above and further objects and features of the invention will more fully be apparent from the following detailed description with accompanying drawings.

BRIEF DESCRIPTION OF THE DRAWINGS

FIG. 5 is a schematic diagram illustrating an example of character data generated by an information output device according to an embodiment of the present invention;

FIG. 7 is a schematic diagram illustrating an example of a line text generated by an information output device according to an embodiment of the present invention;

FIG. 8 is a schematic diagram illustrating an example of data stored in a complementary information dictionary DB provided in an information output device according to an embodiment of the present invention;

FIG. 9 is a schematic diagram illustrating an example of data (before translation permission/denial judgment) stored in translation permission/denial tables generated by an information output device according to an embodiment of the present invention;

FIG. 11 is a schematic diagram illustrating an example of data stored in a special character table provided in an information output device according to an embodiment of the present invention;

FIG. 13 is a schematic diagram illustrating an example of data (after translation permission/denial judgment) stored in translation permission/denial tables generated by an information output device according to an embodiment of the present invention;

FIG. 14 is a schematic diagram illustrating an example of translation-attached document images outputted from an information output device according to an embodiment of the present invention;

DETAILED DESCRIPTION OF NON-LIMITING EXAMPLE EMBODIMENTS

The following description will explain the present invention in detail with reference to the drawings illustrating an embodiment thereof.

Figure 1:
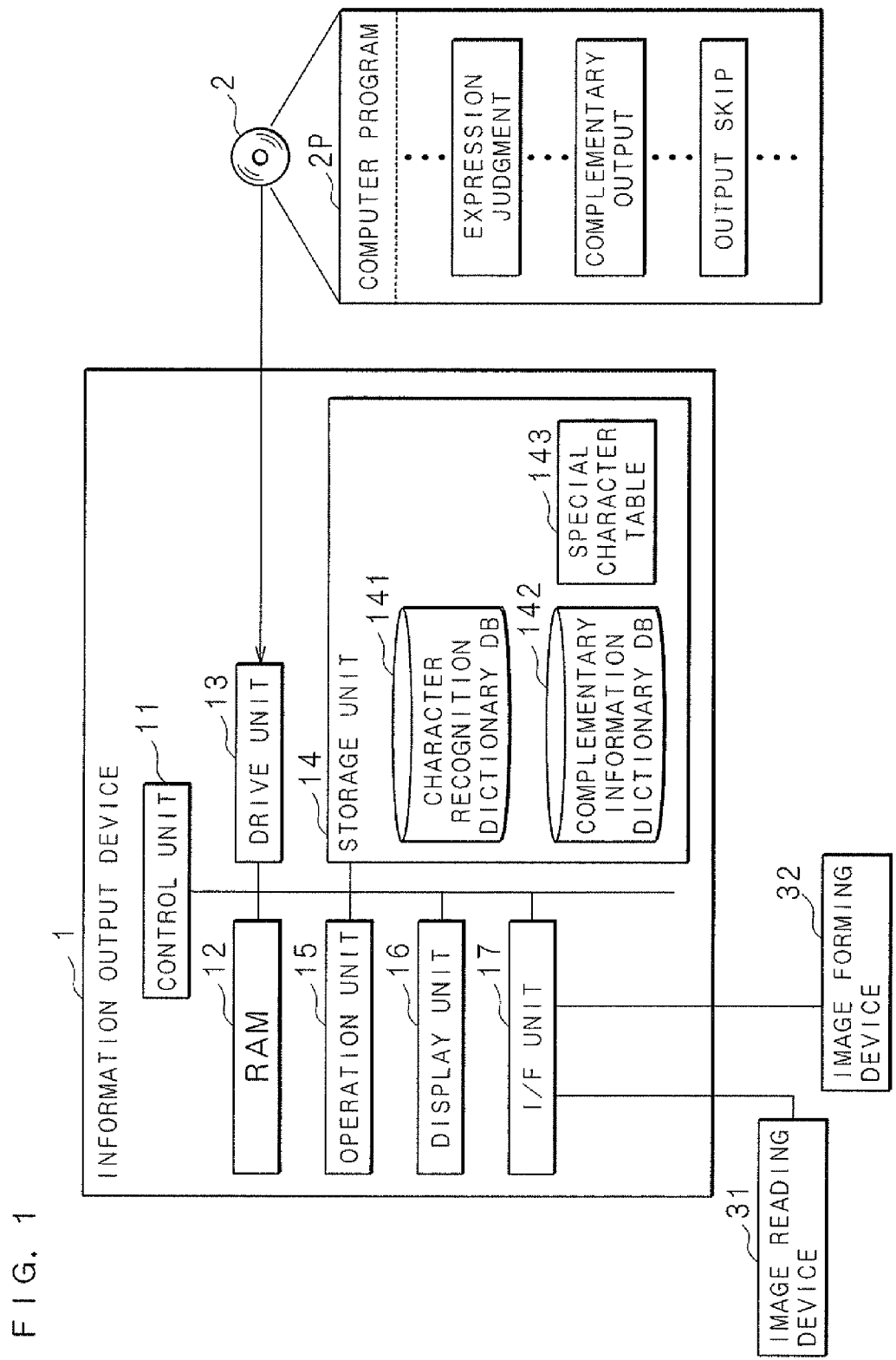
FIG. 1 is a block diagram illustrating the main structure of an information output device according to an embodiment of the present invention.

FIG. 1 is a block diagram illustrating the main structure of an information output device 1 according to an embodiment of the present invention. The information output device 1 is constituted of a general-purpose computer, such as a personal computer or a server. The information output device 1 is provided with a control unit 11, a RAM 12, a drive unit 13, a storage unit 14, an operation unit 15, a display unit 16, and an I/F (interface) unit 17.

The control unit 11 plays a central role in controlling the information output device 1. The control unit 11 controls the respective units of the device using the RAM 12 as a work area, and executes various kinds of processing. The drive unit 13 is constituted of a CD-ROM drive, for example, and reads various kinds of information from a recording medium 2, which is set in the drive unit 13. The recording medium 2 is an optical disk, for example. A computer program 2P is recorded in the recording medium 2. The computer program 2P functions as a computer program in an embodiment of the present invention. The storage unit 14 is constituted of a nonvolatile mass storage device. Various kinds of data is written in and read from the storage unit 14 by the control unit 11.

The control unit 11 reads the computer program 2P from the recording medium 2 set in the drive unit 13, and causes the storage unit 14 to store the read computer program 2P. The control unit 11 also loads the computer program 2P to the RAM 12 and implements an information output method according to an embodiment of the present invention in accordance with the loaded computer program 2P.

In the storage unit 14, a character recognition dictionary DB (database) 141, a complementary information dictionary DB 142 and a special character table 143, which will be respectively described later, are prestored. The operation unit 15 is composed of a keyboard, a mouse and the like to be used by an user to operate the information output device 1. The user inputs various kinds of instructions to the information output device 1 by operating the operation unit 15. An inputted instruction is given to the control unit 11. The display unit 16 is constituted of a liquid crystal display, for example, and displays a translation-attached document image generated by the information output device 1, for example, under control of the control unit 11. The I/F unit 17 is to connect the information output device 1 with an image reading device 31 and an image forming device 32 (which will be respectively described later) provided outside the information output device 1.

The image reading device 31 is a scanner, a digital multifunction peripheral functioning as a scanner, or the like. The image reading device 31 reads a document, which is recorded on paper placed on the image reading device 31, as an image in an optical manner. An image read by the image reading device 31 is transmitted to the information output device 1. The image transmitted at this moment is an original text image representing an original document (i.e., an original text). The control unit 11 of the information output device 1 receives the original text image transmitted from the image reading device 31 via the I/F unit 17.

The present embodiment will be explained using a case where the control unit 11 generates a translation-attached document image in PDF (Portable Document Format) on the basis of a received original text image. A translation-attached document image in the present embodiment has a structure wherein a translated text is attached in the form of rubi as complementary information in a space between lines below an original text. It is to be noted that a space between lines where a translated text is to be attached is not limited to a space between lines below an original text.

Moreover, the present embodiment will be explained using an example wherein an English text is the original text and a Japanese text obtained by translating words or phrases in the English text into Japanese is the translated text. As a specific example, an original expression in English and a translated expression in Japanese are illustrated (see FIGS. 4 and 14, which will be described later).

The control unit 11 causes the display unit 16 to display a generated translation-attached document image, or transmits a generated translation-attached document image to the image forming device 32 via the I/F unit 17. The image forming device 32 is a printer, a digital multifunction peripheral functioning as a printer, or the like, and forms the received translation-attached document image on paper. The image reading device 31 and the image forming device 32 may be constructed as a single unit, though the devices in the present embodiment are constructed as separate units.

It is to be noted that the information output device 1 is not limited to the structure for receiving an original text image from the outside thereof. For example, the information output device 1 may be constructed to allow the user to generate an original text image including a handwritten character by operating the operation unit 15 while watching the display unit 16. A translation-attached document image generated by the information output device 1 may also be transmitted to a personal computer, a server or the like, which is provided outside the information output device 1.

Next, the procedures of generation of a translation-attached document image by the control unit 11 will be explained.

Figure 2:
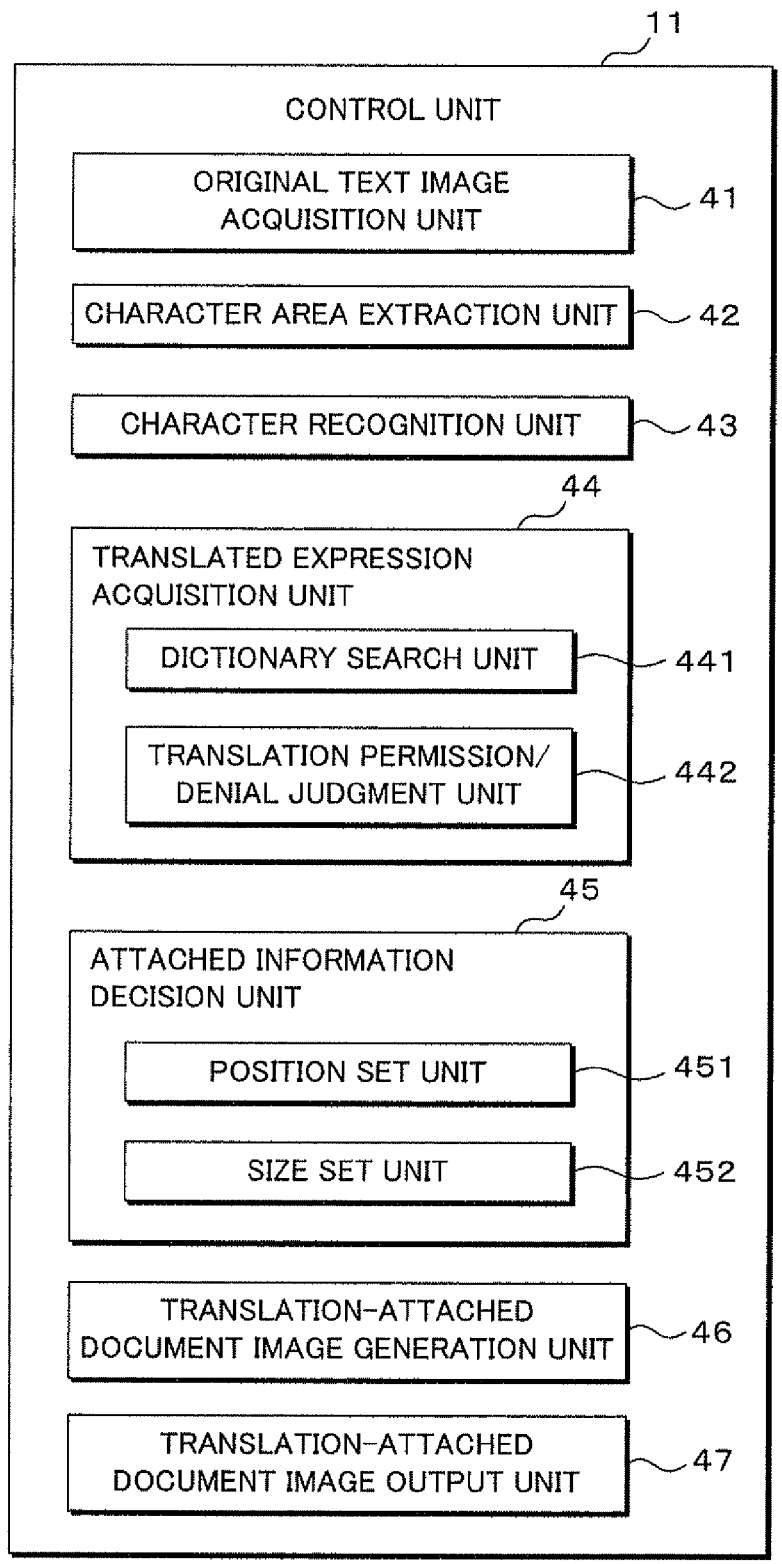
FIG. 2 is a functional block diagram for explaining the procedures of generation of a translation-attached document image by an information output device according to an embodiment of the present invention.
Figure 3:
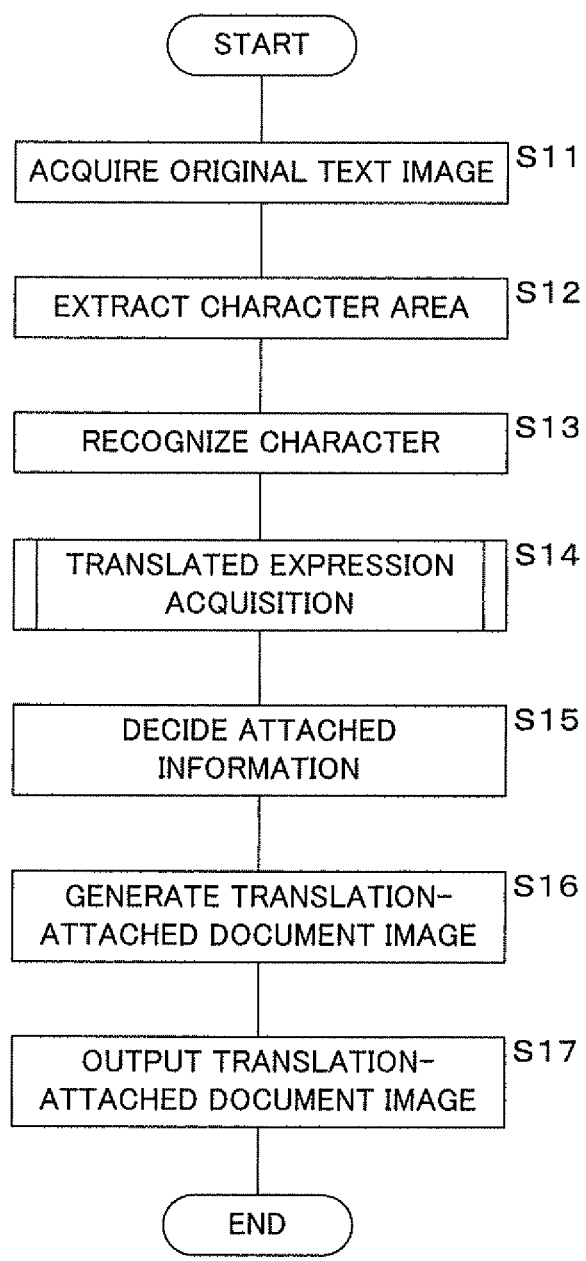
FIG. 3 is a flowchart illustrating the procedures of information output processing executed by an information output device according to an embodiment of the present invention.

FIG. 2 is a functional block diagram for explaining the procedures of generation of a translation-attached document image by the information output device 1. The functions of the control unit 11 are illustrated in FIG. 2. FIG. 3 is a flowchart illustrating the procedures of information output processing executed by the information output device 1.

The control unit 11 executes information output processing illustrated in FIG. 3 in accordance with the computer program 2P loaded to the RAM 12. The control unit 11, which executes the processes of S11 to S17, functions as an original text image acquisition unit 41, a character area extraction unit 42, a character recognition unit 43, a translated expression acquisition unit 44, an attached information decision unit 45, a translation-attached document image generation unit 46, and a translation-attached document image output unit 47, which are illustrated in FIG. 2. The attached information will be described later.

Execution of information output processing is started when the user operates the operation unit 15 in a state where an original is placed on the image reading device 31. The control unit 11 first acquires an original text image (S11). The control unit 11 in S11 transmits an instruction for image reading to the image reading device 31. As a result, an original text image is transmitted from the image reading device 31 to the information output device 1. At this moment, the control unit 11 stores the received original text image in the RAM 12. The control unit 11 also conducts image processing such as adjustment of resolution and conversion of data format for the original text image if desired. It is to be noted that an original text image prestored in the storage unit 14 may be read out to the RAM 12 in S11.

Figure 4:
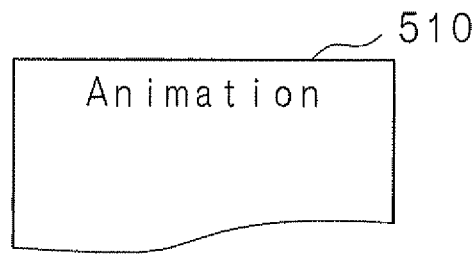
FIG. 4 is a schematic diagram illustrating an example of an original text image inputted to an information output device according to an embodiment of the present invention.

FIG. 4 is a schematic diagram illustrating an example of an original text image inputted to the information output device 1. An original text image 510 illustrated in FIG. 4 includes one line constituted of an original expression "Animation". The following description will explain a case where the original text image 510 is acquired as a result of the process of S11.

After the process of S11 illustrated in FIG. 3 is completed, the control unit 11 extracts a character area including characters from the original text image stored in the RAM 12 (S12) and recognizes characters included in the extracted character area (S13). The control unit 11 in S13 uses a heretofore known OCR (Optical Character Recognition) technique, for example, to recognize characters included in a character area. At this moment, the control unit 11 generates character data such as the data illustrated in FIG. 5, which will be described later, and causes the RAM 12 to store the character data. In character recognition processing, a character is identified by pattern matching mainly using the form (i.e., letter form) of a character. For this purpose, letter form data of the respective characters is prestored in the character recognition dictionary DB 141.

FIG. 5 is a schematic diagram illustrating an example of character data. Character data includes a result (which will be hereinafter referred to as a recognized character) of character recognition in S13 and attached information concerning a recognized character. The "character" in FIG. 5 is a recognized character. In character recognition processing, symbols such as a period and a comma, a space character and the like are also treated as characters. This causes symbols such as "!" and "|" and "(space)" representing a space character to be included in recognized characters, together with alphabets such as "A" and "n".

The "character number" in FIG. 5 is an identification number given respectively to recognized characters in order by the control unit 11. The "left X", "top Y", "right X", "bottom Y", "area number", "position in line" and "size" in FIG. 5 are attached information. The "left X", "top Y", "right X" and "bottom Y" represent the position of each recognized character in an original text image. The position of each recognized character is represented by the X-coordinate of the left end of the recognized character, the Y-coordinate of the top end, the X-coordinate of the right end, and the Y-coordinate of the bottom end. The "area number" is an identification number given to a character area by the control unit 11.

The "position in line" means the position of each recognized character in a line. A position in a line is represented using one number selected from "1" representing a line head, "2" representing a line end, "0" representing a part of a line other than both ends, and "3" representing a line head and a line end. A position in a line "3" is used when only one character exists in a line. Positions in a line "1" and "2" are used when two or more characters exist in a line. A position in a line "0" is used when three or more characters exist in a line. The "size" is a font size of a recognized character, represented using point as a unit.

After the process of S13 illustrated in FIG. 3 is completed, the control unit 11 executes translated expression acquisition processing illustrated in the following FIG. 6 (S14).

Figure 6:
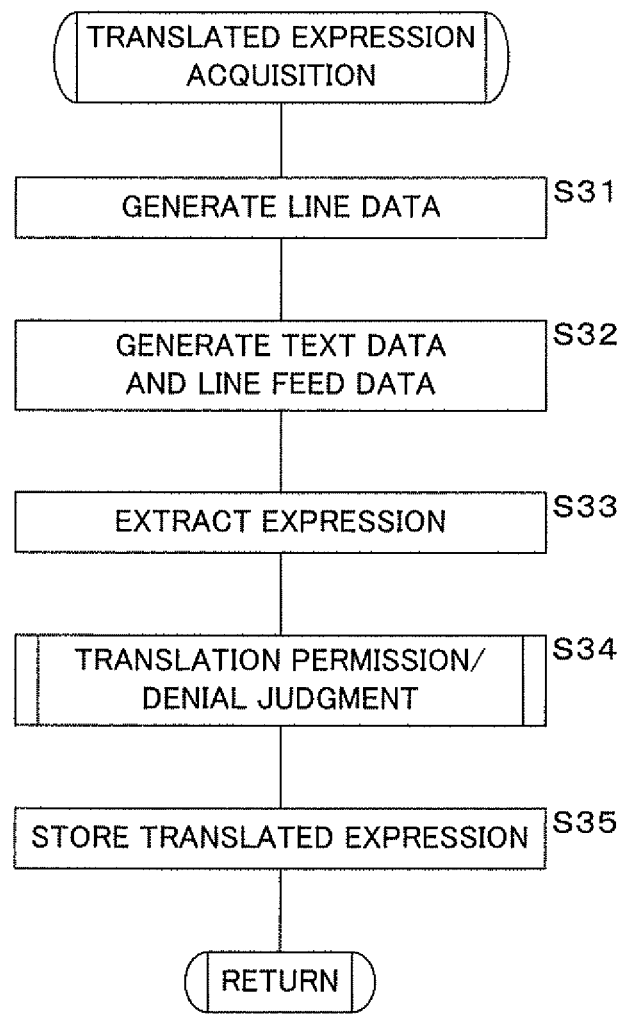
FIG. 6 is a flowchart illustrating detailed procedures of translated expression acquisition processing executed by an information output device according to an embodiment of the present invention.

FIG. 6 is a flowchart illustrating detailed procedures of translated expression acquisition processing. The control unit 11 generates line data representing the content of text in each line on the basis of the character data generated in S13 (S31). The control unit 11 in S31 generates a line text of one line by arranging recognized characters from a character at the line head to a character at the line end in the order of the character number, and generates line data by relating a line number, which is an identification number of a line text, to the generated line text.

Figure 7:
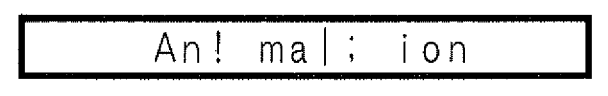

FIG. 7 is a schematic diagram illustrating an example of a line text. A line text generated from the character data illustrated in FIG. 5 is "An!_mal;_ion" illustrated in FIG. 7. Accordingly, the original expression "Animation" is falsely recognized as "An!_mal;_ion". However, the control unit 11 does not judge whether a false recognition has occurred or not at this stage.

Next, the control unit 11 generates text data and line feed data, which will be explained next, on the basis of the line data generated in S31 illustrated in FIG. 6 (S32).

The control unit 11 in S32 generates text data by connecting line texts in the order of the line number. Since the language of the original text illustrated in the present embodiment is English, line texts are connected after inserting a space character at the end of each line text. The position of an inserted space character corresponds to a line feed position. The control unit 11 in S32 generates line feed data by relating a line number to a line feed position.

After the process of S32 is completed, the control unit 11 executes the processes of S33 and S35, which will be described later, using data stored in the complementary information dictionary DB 142 (see the following FIG. 8).

FIG. 8 is a schematic diagram illustrating an example of data stored in the complementary information dictionary DB 142. Stored in the complementary information dictionary DB 142 are data required for natural language processing and translation levels which will be described later. The data required for natural language processing is data representing the grammar of a language, the appearance frequency of a syntax, the meaning of a word, and the like. For example, an original expression, a translated expression and a translation level are stored in the complementary information dictionary DB 142 in relation to each other. In particular, a translated expression "一つの" ("an" in Japanese) and a translation level "0" are related to an original expression "An", and a translated expression "アニメーション" ("animation" in Japanese) and a translation level "4" are related to an original expression "Animation".

A translation level corresponds to the degree of difficulty of an original expression. Translation rubi is attached to an original expression having a high degree of difficulty, while attachment of translation rubi for an original expression having a low degree of difficulty is skipped. This is because it is generally difficult to arrange translation rubi corresponding to all original expressions in a space between lines, and the readability may decrease if all translation rubi can be attached.

The control unit 11 judges that an original expression, a translation level of which is equal to or higher than a set translation level set by the user using the operation unit 15 or a set translation level set by default, has a high degree of difficulty. A set translation level in the present embodiment is equal to or higher than "1", or in particular "4". Accordingly, translation rubi is attached to "Animation", while translation rubi is not attached to "an".

The control unit 11 performs natural language processing for the text data generated in S32 illustrated in FIG. 6 while searching the complementary information dictionary DB 142. At this moment, the control unit 11 extracts an expression included in text represented by the text data (S33). The control unit 11 in S33 performs natural language processing such as morphological analysis of text, local syntax analysis and word class estimation. At this moment, the control unit 11 extracts a word included in a text and a phrase composed of a plurality of words. The control unit 11 then generates a translation permission/denial table (see the following FIG. 9) including an expression which has been extracted (i.e., an extracted expression), and causes the RAM 12 to store the translation permission/denial table.

FIG. 9 is a schematic diagram illustrating an example of data stored in translation permission/denial tables. In fact, the content of the translation permission/denial tables illustrated in FIG. 9 is the one before execution of the process of S34, which will be described later (i.e., before translation permission/denial judgment).

The control unit 11 generates a translation permission/denial table by relating an ID, which is an identification number of an extracted expression, a character number of a recognized character lying at the beginning of an extracted expression, the number of characters of an extracted expression, and a translation level of an original expression corresponding to an extracted expression (which will be hereinafter referred to as a translation level concerning an extracted expression) to each extracted expression. Translation permission/denial, which will be described later, and a translated expression are further related to each extracted expression by executing the processes of S34 and S35, which will be described later.

A translation permission/denial table illustrated in FIG. 9A is generated from text data including the line text "An!_mal;_ion" illustrated in FIG. 7. The following description will explain generation of the translation permission/denial table illustrated in FIG. 9A. A space character is separation between words. This causes the control unit 11 to separate "An!_mal;_ion" into three parts "An!", "mal;" and "ion". Next, "!" included in "An!" is an exclamation mark, and "|" and ";" included in "mal;" are a pipe and a semicolon. This causes the control unit 11 to consider "An!" and "mal;" as "An" and "ma".

In the complementary information dictionary DB 142, "an" and "ion" are stored as original expressions, while either "An" or "ma" is not stored as illustrated in FIG. 8. However, "A" in "An" lies at the beginning of a sentence. Hence, the control unit 11 considers "An" equal to "an". As just described, the expressions "An" and "ion" are expressions, to which translation rubi can be attached. Regarding the expression "ma", it is impossible to attach translation rubi since no translated expression exists.

Consequently, the control unit 11 obtains two extracted expressions "An" and "ion" from "An!_mal;_ion". The control unit 11 then gives an ID "1" to an extracted expression "An", gives an ID "2" to an extracted expression "ion", and stores each ID in the translation permission/denial table together with a character number and the number of characters. As just described, when a false recognition occurs, an extracted expression does not accord with an original expression. An extracted expression, which is extracted by the control unit 11 in S33, is an expression, for which complementary information can be outputted, in an embodiment of the present invention. The control unit 11, which executes the process of S33, functions as an expression extraction unit in an embodiment of the present invention.

When character recognition for an original expression "Animation" is achieved correctly in the process of S13, text data including a line text "Animation" is generated by the processes of S31 and S32. One word "Animation" is obtained from the text data "Animation". The word "Animation" is stored in the complementary information dictionary DB 142 as an original expression, and "Animation" is equal to "animation" since "A" in the word "Animation" lies at the beginning of a sentence. Accordingly, a translation permission/denial table illustrated in FIG. 9B is generated in such a case. As just described, an extracted expression obtained by correct character recognition accords with an original expression.

Here, translation permission/denial means whether translation of each extracted expression stored in a translation permission/denial table is to be permitted or not. Regarding an extracted expression related to translation permission/denial "permission" in a translation permission/denial table, translation rubi is attached to an original expression corresponding to the extracted expression in a translation-attached document image. That is, complementary information is outputted. Regarding an extracted expression related to translation permission/denial "denial" in a translation permission/denial table, translation rubi is not attached to an original expression corresponding to the extracted expression in a translation-attached document image. That is, output of complementary information is skipped.

After the process of S33 illustrated in FIG. 6 is completed, the control unit 11 executes translation permission/denial judgment processing illustrated in the following FIG. 10 (S34). As a result, permission/denial of translation is judged for each extracted expression.

Figure 10:
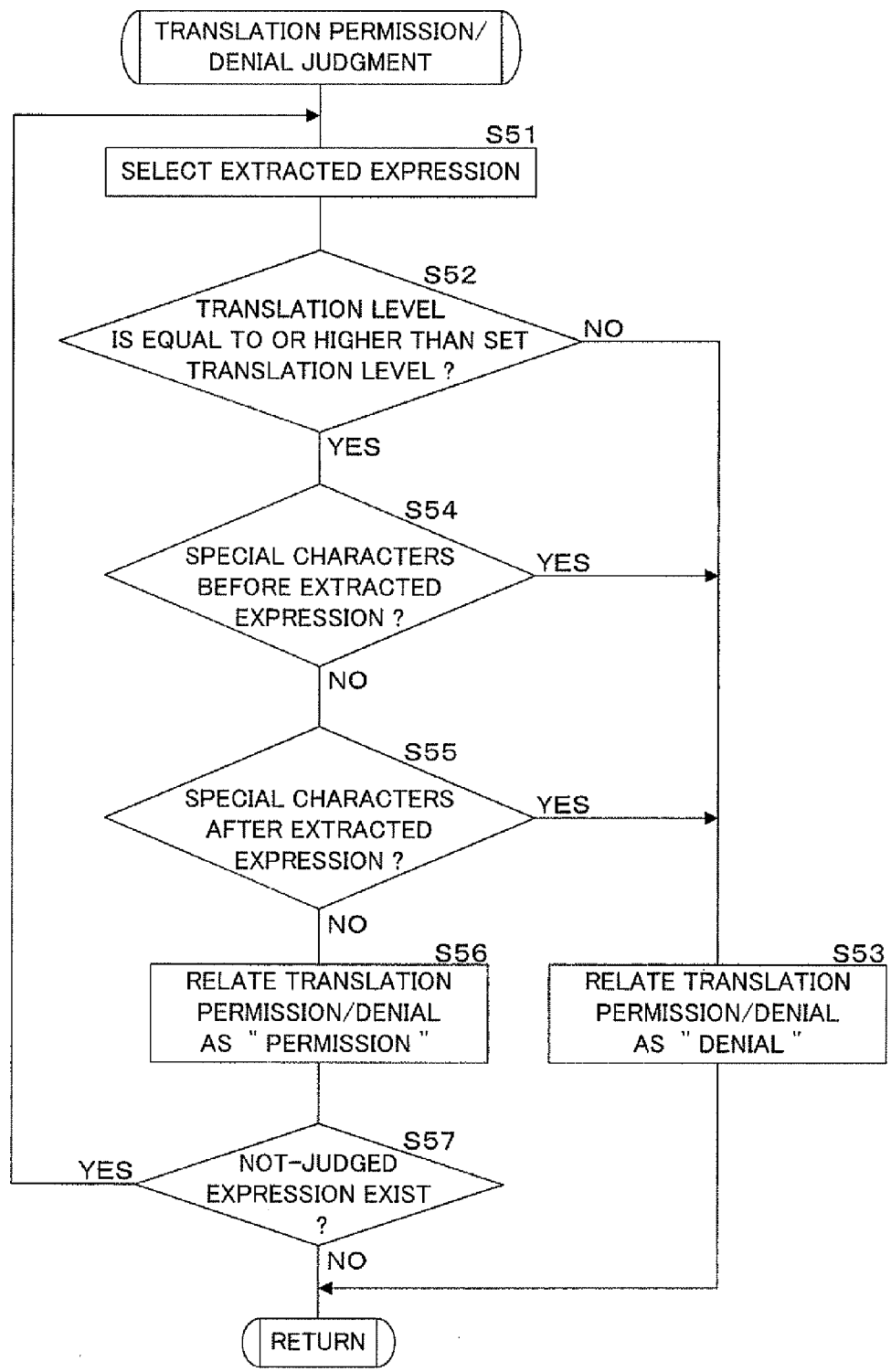
FIG. 10 is a flowchart illustrating detailed procedures of translation permission/denial judgment processing executed by an information output device according to an embodiment of the present invention.

FIG. 10 is a flowchart illustrating detailed procedures of translation permission/denial judgment processing. The control unit 11 selects an extracted expression, for which processes after S52 have not been executed, from extracted expressions stored in the translation permission/denial table (S51). Next, the control unit 11 refers to the translation permission/denial table and judges whether a translation level concerning the extracted expression selected in S51 is equal to or higher than a set translation level or not (S52). When a translation level is lower than the set translation level (NO in S52), the control unit 11 relates translation permission/denial "denial" to the extracted expression selected in S51 in the translation permission/denial table (S53).

In particular, when an extracted expression selected in S51 is "An", a judgment is made as NO in S52 and translation permission/denial "denial" is related to the extracted expression "An" in S53. When an extracted expression selected in S51 is "ion" or "Animation", a judgment is made as YES in S52, since a translation level is equal to or higher than the set translation level.

When a translation level is equal to or higher than a set translation level, translation permission/denial "permission" is related to an extracted expression selected in S51 in a case of conventional procedures. Such conventional procedures cause no particular problem when an extracted expression selected in S51 is an extracted expression stored in the translation permission/denial table illustrated in FIG. 9B. This is because a translated expression corresponding to an original expression can be obtained by searching the complementary information dictionary DB 142 on the basis of an extracted expression stored in the translation permission/denial table illustrated in FIG. 9B. Accordingly, understanding of an original expression is facilitated when a translated expression, which has been obtained, is attached to the original expression as translation rubi.

However, conventional procedures cause a problem when an extracted expression selected in S51 is an extracted expression stored in the translation permission/denial table illustrated in FIG. 9A. This is because a translated expression corresponding to an expression unrelated to an original expression is obtained by searching the complementary information dictionary DB 142 on the basis of an extracted expression stored in the translation permission/denial table illustrated in FIG. 9A. Accordingly, understanding of an original expression is complicated when a translated expression, which has been obtained, is attached to the original expression as translation rubi.

Hence, the control unit 11 in the present embodiment judges whether an extracted expression has been obtained as a result of correct character recognition or as a result of false recognition, by the following procedures. The control unit 11 then relates translation permission/denial "permission" to an extracted expression obtained as a result of correct character recognition, and relates translation permission/denial "denial" to an extracted expression obtained as a result of false recognition.

When a translation level concerning an extracted expression selected in S51 is equal to or higher than a set translation level (YES in S52), the control unit 11 judges whether "M" or more special characters exist right before an extracted expression selected in S51 or not, by retrieving text data (S54). Here, M is a natural number satisfying M≧2, which is defined by the computer program 2P. The detailed process of S54 will be described later. When M or more special characters do not exist right before the extracted expression (NO in S54), the control unit 11 judges whether M or more special characters exist right after an extracted expression selected in S51 or not, by retrieving text data (S55). The detailed process of S55 will be described later.

When M or more special characters exist right before the extracted expression (YES in S54) or when M or more special characters exist right after the extracted expression (YES in S55), the control unit 11 proceeds to the process of S53 and relates translation permission/denial "denial" to an extracted expression selected in S51. In short, translation permission/denial is "denial" when M or more special characters exist at least one of before an extracted expression and after an extracted expression. On the other hand, when M or more special characters do not exist right after an extracted expression (NO in S55), the control unit 11 relates translation permission/denial "permission" to an extracted expression selected in S51 in the translation permission/denial table (S56). In short, translation permission/denial is "permission" when no special character exists or special characters, the number of which is smaller than M, exist before and after an extracted expression.

Here, an explanation will be given for the special character table 143. FIG. 11 is a schematic diagram illustrating an example of data stored in the special character table 143. In the special character table 143, five symbols (see FIG. 11) are stored as special characters, and a character ID to be used for identifying a special character is stored in relation to a special character.

A special character stored in the special character table 143 is a symbol, which is likely to be obtained as a result of false recognition for an alphabet "f", "i", "t" or the like. A special character is not limited to the five illustrated symbols, and a symbol "o", which tends to be obtained by false recognition for an alphabet "o", may be included, for example. Moreover, a number "1", which tends to be obtained by false recognition for an alphabet "l", or a Japanese hiragana character "し", which tends to be obtained by false recognition for an alphabet "L", may be included. Furthermore, different special character tables 143 may be used for languages of an original text to be recognized by character recognition. For example, in a special character table 143 to be used for a case of character recognition for Japanese, a symbol "#", which tends to be obtained by false recognition for a Japanese kanji character "井", may be included.

Figure 12:
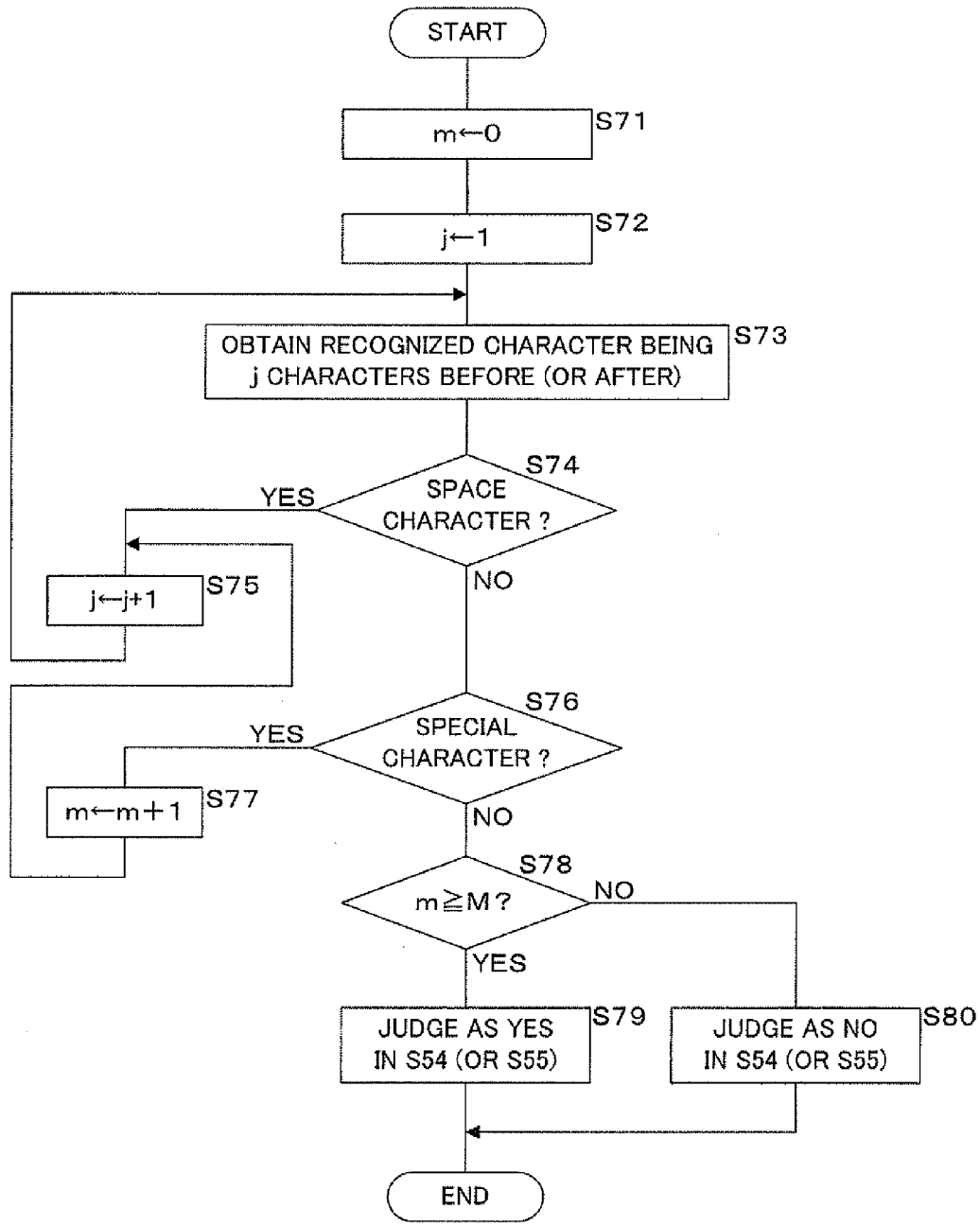
FIG. 12 is a flowchart illustrating detailed process procedures of judgment of whether a special character exists or not, executed by an information output device according to an embodiment of the present invention.

Next, a detailed explanation will be given for the processes of S54 and S55 illustrated in FIG. 10. FIG. 12 is a flowchart illustrating detailed process procedures of S54 (or S55) for judging whether a special character exists or not. The following description will explain first a case where the process of FIG. 12 is executed, regarding S54 using an extracted expression "ion".

The control unit 11 first substitutes 0 in a variable "m" (S71) and substitutes 1 in a variable "j" (S72). The control unit 11 then obtains a recognized character, which is j characters before the first character of an extracted expression, in the text data (S73). By executing the process of S73, a recognized character "_" (i.e., a space character), which is one character before the first character of the extracted expression "ion", is obtained from text data including "An!_mal;_ion". When an extracted expression is "Animation", a recognized character, which is one character before the first character of an extracted expression, does not exist. In other words, any of a space character and a special character does not exist in j characters before the first character of an extracted expression. Accordingly, the control unit 11 can terminate the process of S73, proceed to the next process of S74, and make a judgment as NO in both of S74 and S76, which will be described later, in such a case.

Next, the control unit 11 judges whether the recognized character obtained in S73 is a space character or not (S74). When the recognized character obtained in S73 is a space character (YES in S74), the control unit 11 increments the variable j by 1 (S75) and returns to the process of S73. As a result, m=0 and j=2 are satisfied. A recognized character, which is one character before the first character of an extracted expression "ion", is a space character. Accordingly, the control unit 11 sets the variable j as j=2 and returns to the process of S73.

When the recognized character obtained in S73 is not a space character (NO in S74), the control unit 11 refers to the special character table 143 and judges whether the recognized character obtained in S73 is a special character or not (S76). A recognized character, which is two characters before the first character of the extracted expression "ion", is ";". This is not a space character but a special character. When the recognized character obtained in S73 is a special character (YES in S76), the control unit 11 increments the variable m by 1 (S77), proceeds to the process of S75, and increments the variable j by 1. As a result, m=1 and j=3 are satisfied.

A recognized character, which is three characters before the first character of the extracted expression "ion", is "|". This is not a space character but a special character. Accordingly, the processes of S77 and S75 are executed in series and m=2 and j=4 are satisfied. When the recognized character obtained in S73 is not a special character (NO in S76), that is, when the recognized character obtained in S73 is a character or a symbol other than a special character, the control unit 11 judges whether the variable m is equal to or larger than a constant M or not (S78). Here, the constant M is to be used for judging translation permission/denial reliably. Illustrated in the present embodiment is a case of M=2.

A recognized character, which is four characters before the first character of an extracted expression "ion", is "a". This is not a space character or a special character. Accordingly, the process of S78 is executed in the state of m=2 and j=4. When m≥M is satisfied (YES in S78), M or more special characters exist right before an extracted expression selected in S51 illustrated in FIG. 10. Accordingly, the control unit 11 makes a judgment as YES in the process of S54 (S79). When m<M is satisfied (NO in S78), M or more special characters do not exist right before an extracted expression selected in S51. Accordingly, the control unit 11 makes a judgment as NO in the process of S54 (S80).

Consequently, translation permission/denial "denial" is related to the extracted expression "ion" in S53 illustrated in FIG. 10. It is to be noted that the control unit 11 may judge whether the variable m is equal to or larger than the constant M or not after execution of the process of S77, and proceed to the process of S79 in the case of m≥M or proceed to the process of S75 in the case of m<M. In such an embodiment, the control unit 11 can execute the process of S80 without executing the process of S78 when a judgment is made as NO in S76.

As described above, the variable m in the process illustrated in FIG. 12 is to be used for counting the number of special characters before an extracted character, and the variable j is to indicate what number recognized character before an extracted character is being watched.

In the present embodiment, the control unit 11 performs the process of S74 for each recognized character obtained in S73. This keeps the processes after S76 for a recognized character obtained in S73 undone when the recognized character is a space character. In other words, the control unit 11 ignores a space character and executes judgment of whether a special character exists or not and count of the number of special characters.

A space character in an English text is generally separation between words, between sentences or the like. Accordingly, a space character is not treated as a special character in the present embodiment. Hence, when judgment in S76 is executed without ignoring a space character, the processes after S78 are executed without counting the number of the recognized characters ";" and "|", which exist right before a space character lying before the extracted expression "ion".

If a space character is treated as a special character and M=3 is satisfied, the same result as that of the present embodiment can be obtained regarding the extracted expression "ion". However, sentences are separated by one space character or two space characters, though words are normally separated by one space character. Moreover, there is no assurance that the number of space characters is not falsely recognized. Accordingly, when a space character is treated as a special character, it is difficult to set the constant M, which is to be used for judging translation permission/denial reliably.

For the above reason, the control unit 11 in the present embodiment ignores a space character in the process of judging translation permission/denial.

Next, a case where the process of FIG. 12 is executed will be explained regarding S55. In such a case, the control unit 11 in S73 obtains a recognized character, which is j characters after the last character of an extracted expression, in the text data. At this moment, when any of a space character and a special character does not exist at a recognized character that is j characters after the last character of an extracted expression, the control unit 11 terminates the process of S73, proceeds to the process of next S74, and makes a judgment as NO in both of S74 and S76. The control unit 11 in S79 makes a judgment as YES in the process of S55, and the control unit 11 in S80 makes a judgment as NO in the process of S55.

Consequently, when an extracted expression is "Animation", a judgment is made as NO in both of S54 and S55. Accordingly, translation permission/denial "permission" is related to the extracted expression "Animation" in S56.

The control unit 11, which executes the process of S54 or S55 as described above, functions as an expression judgment unit in an embodiment of the present invention.

Right before (or right after) an extracted expression related to translation permission/denial "denial" as a result of judgment as YES in S54 (or S55), a false recognition is likely to have occurred. Hence, the processes of S54 and S55 are processes for judging whether a false recognition has occurred or not and can be considered as processes for detecting a place where a false recognition has occurred.

After the process of S53 or S56 illustrated in FIG. 10 is completed, the control unit 11 judges whether an extracted expression ("not-judged expression" in the figure), for which processes after S52 have not been executed, exists in extracted expressions stored in the translation permission/denial table or not (S57). When a not-judged expression exists (YES in S57), the control unit 11 returns to the process of S51. When a not-judged expression does not exist (NO in S57), the control unit 11 terminates translation permission/denial judgment processing and returns to the translated expression acquisition processing illustrated in FIG. 6.

After the process of S34 illustrated in FIG. 6 is completed, the control unit 11 stores a translated expression of an extracted expression related to translation permission/denial "permission" in extracted expressions stored in the translation permission/denial table, in the translation permission/denial table in relation to the extracted expression (S35). The control unit 11 in S35 acquires a translated expression of an extracted expression by searching the complementary information dictionary DB 142 on the basis of the extracted expression related to translation permission/denial "permission".

FIG. 13 is a schematic diagram illustrating an example of data stored in translation permission/denial tables. In fact, the content of the translation permission/denial tables illustrated in FIG. 13 is the one after execution of the process of S34 (that is, after translation permission/denial judgment). By executing the process of S34, the translation permission/denial table illustrated in FIG. 9A becomes a translation permission/denial table illustrated in FIG. 13A, and the translation permission/denial table illustrated in FIG. 9B becomes a translation permission/denial table illustrated in FIG. 13B.

If a translated expression is stored in the translation permission/denial table at the stage of execution of the process of S33, an improper translated expression may possibly be related to an extracted expression obtained as a result of correct character recognition. This is because it is required to estimate the most appropriate translated expression in view of the meaning of expressions before and after each expression, when the expression has a plurality of translated expressions. At this moment, the most appropriate translated expression is unlikely to be estimated in view of the meaning of an extracted expression to be translation permission/denial "denial" in the process of S34.

After S35 is completed, the control unit 11 terminates translated expression acquisition processing and returns to information output processing illustrated in FIG. 3.

The control unit 11, which executes the processes of S33 and S35 illustrated in FIG. 6, functions as a dictionary search unit 441 illustrated in FIG. 2, and the control unit 11, which executes the process of S34, functions as a translation permission/denial judgment unit 442.

After the process of S14 illustrated in FIG. 3 is completed, the control unit 11 decides attached information such as a location and a font size for arranging translation rubi in a translation-attached document image, regarding each translated expression stored in the translation permission/denial table (S15).

The control unit 11 then generates a translation-attached document image, in which translation rubi is attached to an original text, by arranging translation rubi in an original text image on the basis of the attached information decided in the process of S15 (S16). For executing the processes of S15 and S16, a heretofore known technique such as the technique described in Japanese Patent Application Laid-Open No. 2011-100356 may be used, for example.

At last, the control unit 11 outputs a translation-attached document image (S17). The control unit 11 in S17 executes output of a translation-attached document image in an arbitrary form, such as causing the display unit 16 to display the translation-attached document image, causing the image forming device 32 to form an image on paper, causing the storage unit 14 or an external file server, which is not illustrated in the figures, to store the translation-attached document image, or attaching the translation-attached document image to an electronic mail and transmitting the electronic mail.

The control unit 11, which executes the process of S56 illustrated in FIG. 10 and then executes the process of S35 illustrated in FIG. 6 and further executes the processes after S15 illustrated in FIG. 3, functions as a complementary output unit in an embodiment of the present invention. Moreover, the control unit 11, which executes the process of S53 when a judgment is made as YES in S54 or S55 illustrated in FIG. 10 and then executes the process of S35 illustrated in FIG. 6 and further executes the processes after S15 illustrated in FIG. 3, functions as an output skip unit in an embodiment of the present invention.

FIG. 14 is a schematic diagram illustrating an example of translation-attached document images outputted from the information output device 1. When the control unit 11 executes the process of S34 illustrated in FIG. 6 and the translation permission/denial table illustrated in FIG. 13A is obtained, the control unit 11 executes the process of S16 illustrated in FIG. 3, so that a translation-attached document image 511 illustrated in FIG. 14A is generated. When an original expression "Animation" is falsely recognized, attachment of translation rubi to the original expression "Animation" is skipped as illustrated in the translation-attached document image 511.

On the other hand, when the control unit 11 executes the process of S34 illustrated in FIG. 6 and the translation permission/denial table illustrated in FIG. 13B is obtained, the control unit 11 executes the process of S16 illustrated in FIG. 3, so that a translation-attached document image 512 illustrated in FIG. 14B is generated. When character recognition for an original expression "Animation" is correctly achieved, translation rubi "アニメーション" ("animation" in Japanese) is attached to the original expression "Animation" as illustrated in the translation-attached document image 512.

When the user watches the translation-attached document image 511 outputted in S17 illustrated in FIG. 3, the user cannot make out whether the reason of not having translation rubi attached to the original expression "Animation" is because the translation level of the original expression "Animation" has been lower than the set translation level or because the original expression "Animation" has been falsely recognized.

Therefore, a flag indicating that a false recognition has occurred in the process of character recognition may be set for the extracted expression "ion", for which a judgment has been made as YES in S54 or S55, and underscoring or half-tone dot meshing, for example, may be applied to a part corresponding to an extracted expression "ion" in the original expression "Animation". In such a case, the original expression "Animation", for which attachment of translation rubi has been skipped, can be distinguished from another expression, for which attachment of translation rubi has been skipped because a translation level thereof has been lower than the set translation level. In such a case, the user is further allowed to understand that a false recognition has occurred before or after the part "ion" of the original expression "Animation".

Figure 15:
FIG. 15 is a schematic diagram illustrating an example of a translation-attached document image outputted from a conventional information output device.

FIG. 15 is a schematic diagram illustrating an example of a translation-attached document image outputted from a conventional information output device. A translation-attached document image 513 illustrated in FIG. 15 is outputted from a conventional information output device, which executes the process of S56 without executing the processes of S54 and S55 when a judgment is made as YES in the process of S52 illustrated in FIG. 10. As illustrated in FIG. 15, translation rubi "イオン" ("ion" in Japanese) unrelated to the original expression "Animation" is attached to the original expression "Animation", since the original expression "Animation" has been falsely recognized.

Yet, when the user watches the translation-attached document image 513 outputted in S17, the user may still realize that unrelated translation rubi has been attached to the original expression "Animation" because of false recognition, since the location of the translation rubi "イオン" ("ion" in Japanese) shifts backward from the location of the original expression "Animation".

Figure 16A:
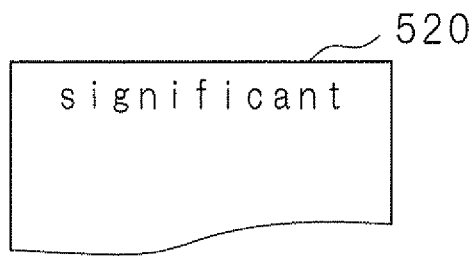
FIG. 16 is a schematic diagram illustrating another example of an original text image and translation-attached document images.
Figure 16B:
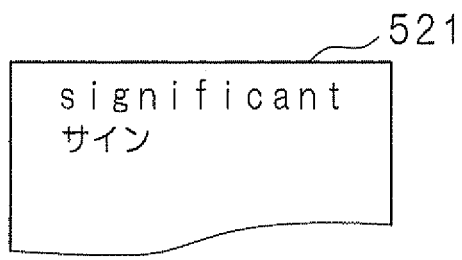
Figure 16C:
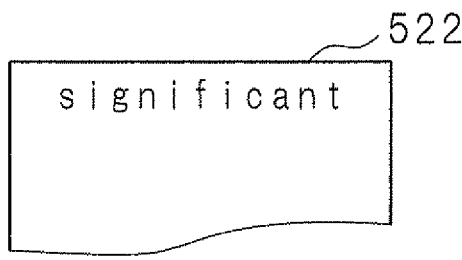

FIG. 16A is a schematic diagram illustrating another example of an original text image. FIGS. 16B and 16C are schematic diagrams illustrating another example of translation-attached document images. An original text image 520 illustrated in FIG. 16A includes one line constituted of an original expression "significant". When the original expression "significant" is falsely recognized as "sign_;|cant", the control unit 11 in S33 illustrated in FIG. 6 separates "sign_;|cant" into two parts "sign" and "cant". Next, the control unit 11 obtains one extracted expression "sign" from "sign" and "cant". This is because a word "cant" is not stored in the complementary information dictionary DB 142.

With a conventional information output device, translation permission/denial "permission" is related to the extracted expression "sign". Hence, a translation-attached document image 521 illustrated in FIG. 16B is generated and outputted. When the user watches the translation-attached document image 521, the user is likely to misunderstand that "サイン" ("sign" in Japanese) is a translated expression of the original expression "significant", since the location of translation rubi "サイン" ("sign" in Japanese) corresponds to the original expression "significant".

On the other hand, with the information output device 1, translation permission/denial "denial" is related to the extracted expression "sign". This is because M or more special characters exist right after the extracted expression "sign". As s result, a translation-attached document image 522 illustrated in FIG. 16C is generated and outputted.

Next, the reason that the constant M satisfies MA≠1 will be explained. When an original expression "Animation" in the original text image 510 illustrated in FIG. 4 is falsely recognized as "An!_ma|;_ion" or when an original expression "significant" in the original text image 520 illustrated in FIG. 16A is falsely recognized as "sign_;|cant", no problem occurs even when M=1 is satisfied. However, if M=1 is satisfied, a problem arises that translation permission/denial "denial" is related to an expression right after an exclamation mark when text data including an exclamation mark is obtained as a result of correct character recognition, for example.

Figure 17A:
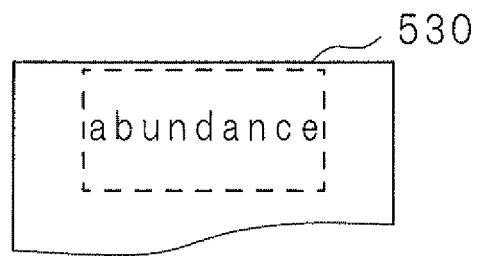
FIG. 17 is a schematic diagram illustrating yet another example of an original text image and translation-attached document images.
Figure 17B:
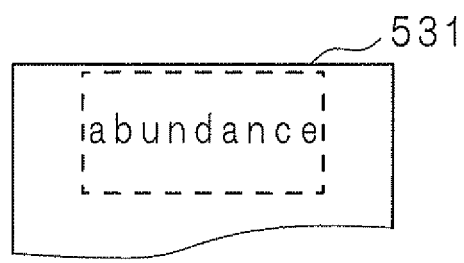
Figure 17C:
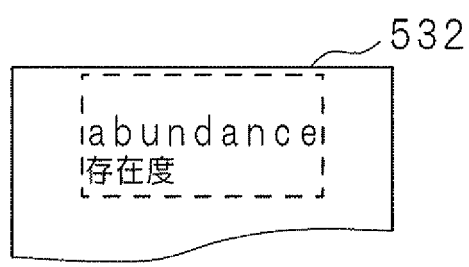

Moreover, the following examples are also possible. FIG. 17A is a schematic diagram illustrating another example of an original text image. FIGS. 17B and 17C are schematic diagrams illustrating another example of translation-attached document images. An original text image 530 illustrated in FIG. 17A includes one line constituted of an original expression "abundance" and broken lines in a rectangle shape surrounding the line. In the case of the original text image 530, a part of the broken lines lying right before the original expression "abundance" may be falsely recognized as a special character "|", so that text data including a line text "|_abundance" may be generated.

At this moment, when M=1 is satisfied, translation permission/denial "denial" is related to the extracted expression "abundance" and a translation-attached document image 531 illustrated in FIG. 17B is obtained. That is, a problem arises that translation rubi is not attached even though an extracted expression "abundance" is obtained by correct character recognition for an original expression. On the other hand, when M≥2 is satisfied, translation permission/denial "permission" is related to the extracted expression "abundance" and a translation-attached document image 532 illustrated in FIG. 17C is obtained. That is, translation rubi "存在度" ("abundance" in Japanese) is attached to the original expression "abundance".

Next, a case where an original expression "Animation" is falsely recognized as "An!ma|;ion" or a case where an original expression "significant" is falsely recognized as "sign;|cant" will be described. That is, a case where no space character exists before and after a special character will be described. In such a case, the control unit 11 can consider a special character as separation between words. At this moment, the control unit 11 separates "An!ma|;ion" into three parts "An!", "ma|;" and "ion", and obtains extracted expressions "An" and "ion" in the process of S33 illustrated in FIG. 6. The control unit 11 also separates "sign;|cant" into two parts "sign" and "cant", and obtains an extracted expression "sign" in the process of S33.

It is to be noted that the control unit 11 may be constructed to consider "An!ma|;ion" as one word "An!ma|;ion" and consider "sign;|cant" as one word "sign;|cant". In such a structure, the control unit 11 does not consider a special character, which does not lie adjacent to a space character, as separation between words. In such a case, translation rubi is not attached to the original expressions "Animation" and "significant", since the respective words "An!ma|;ion" and "sign;|cant" are not stored in the complementary information dictionary DB 142.

However, with such a structure, the control unit 11 does not conduct a process for detecting existence of false recognition and a process for detecting a place where a false recognition has occurred, for the respective words "An!ma|;ion" and "sign;|cant". This is because the respective words "An!ma|;ion" and "sign;|cant" are treated as what are not extracted expressions, as a result of the process of S33.

With the information output device 1, the information output method and the computer program 2P described above, it is possible to prevent a problem that translation rubi unrelated to an original expression is attached to the original expression as a result of occurrence of a false character recognition. As a result, the possibility of attachment of translation rubi unrelated to an original expression to the original expression is reduced and therefore the quality of translation in a translation-attached document image can be improved.

It is to be noted that the information output device 1 is not limited to the structure for generating and outputting a translation-attached document image. For example, the information output device 1 may be constructed to generate and output a comparison table of an original expression and a translated expression. Moreover, an original text is not limited an English text, and a translated text is not limited to a Japanese text. Furthermore, an original text image and a translation-attached document image may be respectively a color image or a monochrome image. Furthermore, the information output device 1 may be constructed to generate and output a complementary information-attached document image, in which a comment on an original text, a Japanese yomigana character, a phonetic symbol, a Chinese pinyin symbol or the like is attached to an original text as complementary information.

The information output device 1 may generate a translation-attached document image in a form other than PDF. The present invention is not limited to the present embodiment wherein the control unit 11, which plays a central role in controlling the information output device 1, implements an information output method in an embodiment of the present invention in accordance with the computer program 2P. For example, the information output device 1 may be constructed to have a dedicated arithmetic circuit for executing the whole or part of arithmetic processing concerning an information output method in an embodiment of the present invention. The information output device 1 is also not limited to the structure constituted of a general-purpose computer, but may be constituted of a scanner, a printer, a digital multifunction peripheral or the like.

Though the computer program 2P of the present embodiment is recorded on a transportable recording medium 2 and distributed, the present invention is not limited to such a structure. The computer program 2P may be delivered via a communication line, stored in the storage unit 14 at the factory, or read from a recording medium or a distributor and directly executed without being installed to the information output device 1. Moreover, the character recognition dictionary DB 141, the complementary information dictionary DB 142 and the special character table 143 are not limited to the structure to be stored in the storage unit 14 built in the information output device 1 as long as the control unit 11 can freely search or refer thereto, and may be stored in an external storage device.

The embodiment disclosed above should be considered to be illustrative in all respects and not restrictive. The scope of the present invention is not defined by the above description, and equivalence of the claims and all changes that fall within the claims are intended to be embraced by the claims. Moreover, an information output device 1 may include components, which are not disclosed in the above embodiment, as long as the information output device 1 has the effect of the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information output device for outputting complementary information related to a document obtained by character recognition for an image, comprising:
    an expression extraction unit for extracting an expression, for which complementary information can be outputted, from the document;
    an expression judgment unit for judging whether a character or a symbol adjacent to a beginning or an end of the expression extracted by the expression extraction unit is a predetermined character or symbol or not;
    a complementary output unit for outputting complementary information related to the extracted expression when the expression judgment unit judges that the character or symbol adjacent to a beginning or an end of the extracted expression is not the predetermined character or symbol; and
    an output skip unit for skipping output of complementary information related to the extracted expression when the expression judgment unit judges that the character or symbol adjacent to a beginning or an end of the extracted expression is the predetermined character or symbol.

2. The information output device according to claim 1, wherein the expression judgment unit judges whether all of N (N is a natural number satisfying $N \geq 2$) characters or symbols adjacent to a beginning or an end of the extracted expression are the predetermined character or symbol or not,
    the complementary output unit outputs complementary information related to the extracted expression when the expression judgment unit judges that at least one character or symbol of the N characters or symbols is not the predetermined character or symbol, and
    the output skip unit skips output of complementary information related to the extracted expression when the expression judgment unit judges that all of the N characters or symbols are the predetermined character or symbol.

3. The information output device according to claim 1, wherein the expression judgment unit ignores a space character when the space character lies adjacent to a beginning or an end of the extracted expression.

4. An information output device for outputting complementary information related to a document obtained by character recognition for an image, comprising
    a control unit executing following steps of:
        extracting an expression, for which complementary information can be outputted, from the document;
        judging whether a character or a symbol adjacent to a beginning or an end of the extracted expression is a predetermined character or symbol or not;
        outputting complementary information related to the extracted expression when it is judged that the character or symbol adjacent to a beginning or an end of the extracted expression is not the predetermined character or symbol; and
        skipping output of complementary information related to the extracted expression when it is judged that the character or symbol adjacent to a beginning or an end of the extracted expression is the predetermined character or symbol.

5. An information output method for outputting complementary information related to a document obtained by character recognition for an image, comprising steps of:
    extracting an expression, for which complementary information can be outputted, from the document;
    outputting complementary information related to the extracted expression when a character or a symbol adjacent to a beginning or an end of the extracted expression is not a predetermined character or symbol; and skipping output of complementary information related to the extracted expression when the character or symbol adjacent to a beginning or an end of the extracted expression is the predetermined character or symbol.

6. A non-transitory computer-readable recording medium storing a computer program to cause a computer to output complementary information related to a document obtained by character recognition for an image, the computer program comprising:

an extraction step of causing a computer to extract an expression, for which complementary information can be outputted, from the document;

an expression judgment step of causing a computer to judge whether a character or a symbol adjacent to a beginning or an end of the expression extracted in the extraction step is a predetermined character or symbol or not;

an output step of causing a computer to output complementary information related to the extracted expression when it is judged in the expression judgment step that the character or symbol adjacent to a beginning or an end of the extracted expression is not the predetermined character or symbol; and a skip step of causing a computer to skip output of complementary information related to the extracted expression when it is judged in the expression judgment step that the character or symbol adjacent to a beginning or an end of the extracted expression is the predetermined character or symbol.

* * * * *